US005129059A

United States Patent [19]

Hannah

[11] Patent Number: 5,129,059

[45] Date of Patent: * Jul. 7, 1992

[54] GRAPHICS PROCESSOR WITH STAGGERED MEMORY TIMING

[75] Inventor: Marc R. Hannah, Menlo Park, Calif.

[73] Assignee: Silicon Graphics, Inc., Mountain View, Calif.

[ * ] Notice: The portion of the term of this patent subsequent to Feb. 5, 2008 has been disclaimed.

[21] Appl. No.: 644,829

[22] Filed: Jan. 23, 1991

Related U.S. Application Data

[63] Continuation of Ser. No. 243,788, Sep. 13, 1988, Pat. No. 4,991,110.

[51] Int. Cl.[5] .............................................. G06F 15/00

[52] U.S. Cl. ................................ 395/166; 365/189.12

[58] Field of Search ........................ 364/518, 521, 513; 365/189.12; 340/750; 395/166

[56] References Cited

U.S. PATENT DOCUMENTS 4,673,930 6/1987 Bujalski et al. ................ 340/750 X
4,674,064 6/1987 Vaughn .............................. 364/900
4,796,232 1/1989 House ................................ 364/900
4,800,530 1/1989 Itoh et al. ...................... 365/189.12
4,814,969 3/1989 Kiyooka .......................... 364/513 X
4,903,217 2/1990 Gupta et al. ........................ 364/521
4,912,658 3/1990 Sfarti et al. ......................... 395/166
4,991,110 2/1991 Hannah ............................... 364/518

*Primary Examiner*—Gary V. Harkcom
*Assistant Examiner*—Mark K. Zimmerman
*Attorney, Agent, or Firm*—Blakely, Sokoloff, Taylor & Zafman

[57] ABSTRACT

A graphics processor is coupled to a plurality of RAMs (Random Access Memories) for storing a frame of a display. The processor provides a separate RAS (Row Address Strobe) signal and a separate CAS (Column Address Strobe) signal to each of the memories so that row and/or column addresses to each of the RAMs can be latched using a staggered timing sequence. Data can be written into or read from memory using this staggering technique, wherein overall data transfer rate is faster than the memory cycle time of each to of the RAMs.

18 Claims, 11 Drawing Sheets

FIG_7B →

FIG_7C →

GRAPHICS PROCESSOR WITH STAGGERED MEMORY TIMING

This is a continuation of application Ser. No. 243,788, filed Sep. 13, 1988, now U.S. Pat. No. 4,991,110.

BACKGROUND OF THE INVENTION

1. Field of the Invention

The present invention relates to a field of processor control of memory and more specifically to providing staggered timing of control signals to control a plurality of memory devices.

2. Prior Art

Various schemes for accessing memory are well known in the prior art. In the simplest of structures, address lines and data lines are coupled to a memory, wherein address signals on the address lines access a given location of the memory for reading or writing of data. The data transfer is achieved on the data lines. Further, various control signals are coupled to the memory for providing timing and other functions, such as enabling the writing and/or reading operations associated with the memory.

Memory devices come in a variety of types and forms. One of the more well-known memory devices is a random-access-memory (RAM), which is fabricated as a semiconductor "chip". A RAM device is comprised of a plurality of memory locations called cells and these cells are structured into a matrix having rows and columns. The address signal must provide the row address and the column address to select a given cell location. In many instances row and column addresses are time multiplexed on the address lines and a row address strobe (RAS) and a column address strobe (CAS) are used to strobe in the row and column addresses, respectively, to the memory device.

In a typical prior art arrangement using a plurality of memory units, address and, data lines, the RAS and CAS lines are all coupled to the individual memory units. Generally, data transfer is achieved simultaneously from all or selective memory units. Various schemes are available for selective memory use, including the use of chip enable signals to enable the selected chip. In some instances, the plurality of memory units are arranged in an array.

One application of such use of a plurality of memories involves the utilization of a graphics processor to produce video images onto a display, such as a viewing screen. Generally, a processor is specially designated to perform as a graphics processor in manipulating video data to provide the image displayed. The memory is coupled to the graphics processor for the purpose of storing video data, which are to be used for providing pixel information to the display unit. For example, in a typical frame-buffer based graphics system, a digital representation of the image of a frame of the display is stored in the frame-buffer memory, wherein one or more bits of data represent each pixel of the viewing screen. An update processor renders a picture into the image memory and a display processor or a mapping circuit then reads the frame-buffer memory in raster scanned order to map the digital code to the protocol of the display screen, such as the red/green/blue (RGB) protocol. Because of the larger memory size requirement of the frame buffer, low cost dynamic random-access-memories (DRAMs) are normally used as the individual memory elements.

In systems where a single processor is used to perform the data manipulation function, the number of memory locations that can be updated each second, commonly referred to as the memory bandwidth, is typically the factor limiting the performance. Because of the use of common address, data and control lines to drive the memory, usually only one memory word is updated every memory cycle time, which is typically on the order of 300 nanoseconds for a DRAM. The memory bandwidth places a limitation on how quickly a new image can be drawn in the image memory.

It is appreciated then that what is needed is a scheme to increase the memory bandwidth of a graphics update processor without severely complicating the structure of a basic video system.

SUMMARY OF THE INVENTION

The present invention describes a memory accessing scheme of a graphics processor, wherein data is written into and read from a memory in a staggered fashion. A plurality of RAM chips are coupled to the graphics processor through an address bus and a data bus. The graphics processor couples a separate RAS signal and a separate CAS signal to each RAM chip of the memory. By staggering the timing of the RAS and/or CAS signals to the memory, data can be transferred in a staggered fashion to each RAM or different addresses can be provided to each RAM in a memory cycle. The preferred embodiment also has staggered output enable signals, wherein data from the RAMs can be read out in a staggered fashion.

In an alternative embodiment, the graphics processor is also coupled to an address switcher and a data switcher to provide the switching of address and data signals to an array of RAM chips at staggered intervals to provide proper timing for valid data transfers. Further, because the data lines are bidirectional, the data switcher also controls the direction of the data flow.

In one operation, CAS signals are staggered so that different data is written into each section of the memory. In another technique, the RAS signals are staggered so that the same data is written into different row address locations. In a third technique CAS and output enable signals are staggered so that different data can be read from each section of the memory.

DETAILED DESCRIPTION OF THE INVENTION

An apparatus to provide staggered timing to control transfer of data to and from a plurality of memory elements is described. In the following description, numerous specific details are set forth such as specific circuits, etc., in order to provide a thorough understanding of the present invention. It will be obvious, however, to one skilled in the art that the present invention may be practiced without these specific details. In other instances, wellknown structures and signal lines have not been described in detail in order not to unnecessarily obscure the present invention.

Figure 1:
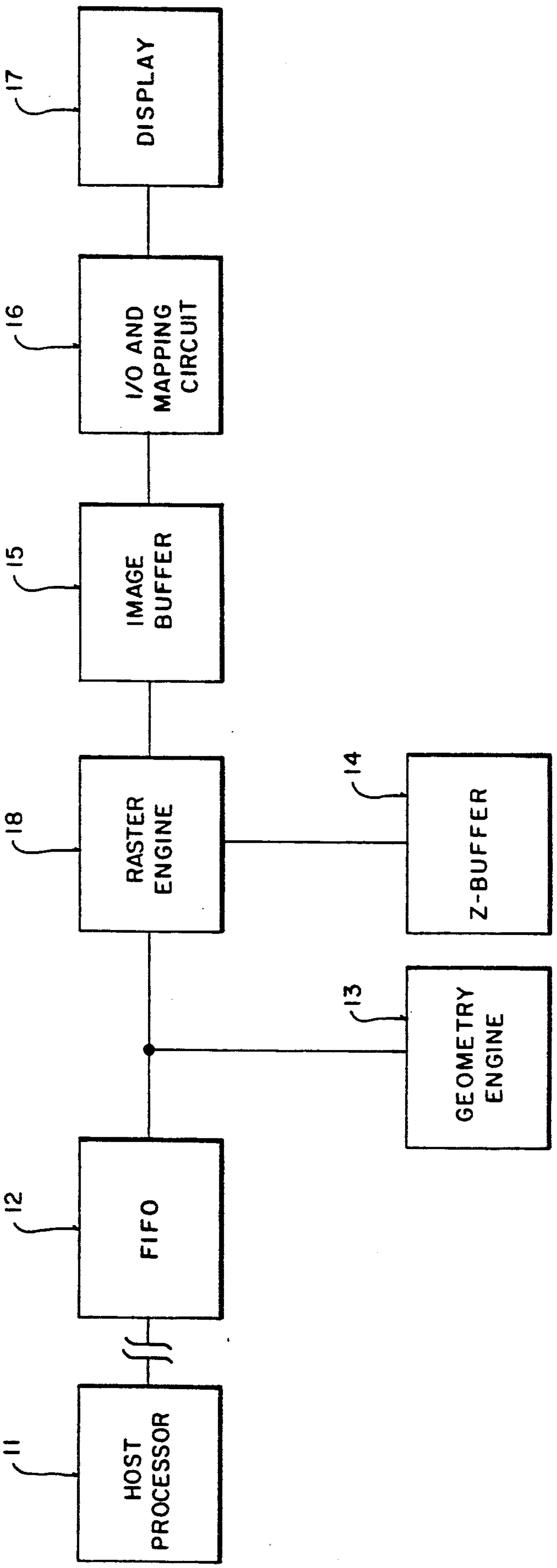
FIG. 1 is a block schematic diagram showing a video display system and the context in which the present invention is used.

Referring to FIG. 1, a block diagram shows the context in which the present invention is used. The diagram of FIG. 1 is used to provide information which is to be presented on a video display, such as a video imaging screen. Typically, a host processor 11 provides digital information as input to a first in first out (FIFO) buffer 12. The host processor 11, which can be a main processor of a computer system, is responsible for providing the necessary data and/or instructions which generate pixel information for the display. The host processor 11 also provides necessary information for generating address signals to FIFO 12 for generating address signals. Control signals are also provided on various control lines to allow the host processor 11 to interface with graphics units 12 through 18. The control lines can, but not necessarily, go through FIFO 12.

The address and data information pipelined through FIFO 12 is provided to two video processors 13 and 18. Some commands are executed by the geometry engine 13, some go directly to the raster engine 18, but the common case entails the commands to be executed by the geometry engine 13 and its commands are then sent to the raster engine 18. A geometry engine 13 and a raster engine 18 function together to operate on the digital data for conversion to image frame data, which can be readily displayed onto a video display. The raster engine 18 is the graphics update processor for converting the digital information commands to a frame format, which provide the signals for controlling the pixels of the raster display. That is, the raster engine 18 generates necessary digital pixel information for representing a frame of a video screen. The pixel information is stored in two memory units, labeled as image buffer 15 and Z-buffer 14. The image buffer 15 and Z-buffer 14 store color and depth information, respectively, for each pixel on the display. The geometry engine 13 operates to provide the necessary geometry of the item, such as a polygon, to be displayed, and further provides commands to the raster engine 18.

Video data is stored in the image buffer 15 by using a frame format so that a complete image frame is represented by the stored information. This video data is stored in the image buffer for output to an input/output (I/O) and mapping circuit 16 for presentation onto display 17. Circuit 16 provides the I/O interface, as well as the necessary mapping of pixel information from image buffer 15 onto a display 17. A popular mapping technique is converting the digital code stored in the image buffer 15 to a RGB format. It is to be noted that information can be readily written into or read from the two memories 14 and 15. In some instances considerable manipulation of stored data is necessary before it is finalized for output onto the display unit 17. The two graphics engines 13 and 18 are available in various forms.

Although a particular block diagram is shown in FIG. 1, it is to be appreciated that the present invention can be readily adapted to be used in other systems. Further, the raster engine 18 of the present invention can be interfaced to one, two, or more memories. The following examples show a coupling to one memory, but such is provided for simplicity of understanding. Therefore, multiple memories can be readily operated on by a single raster engine 18 by the practice of the present invention.

Figure 2:
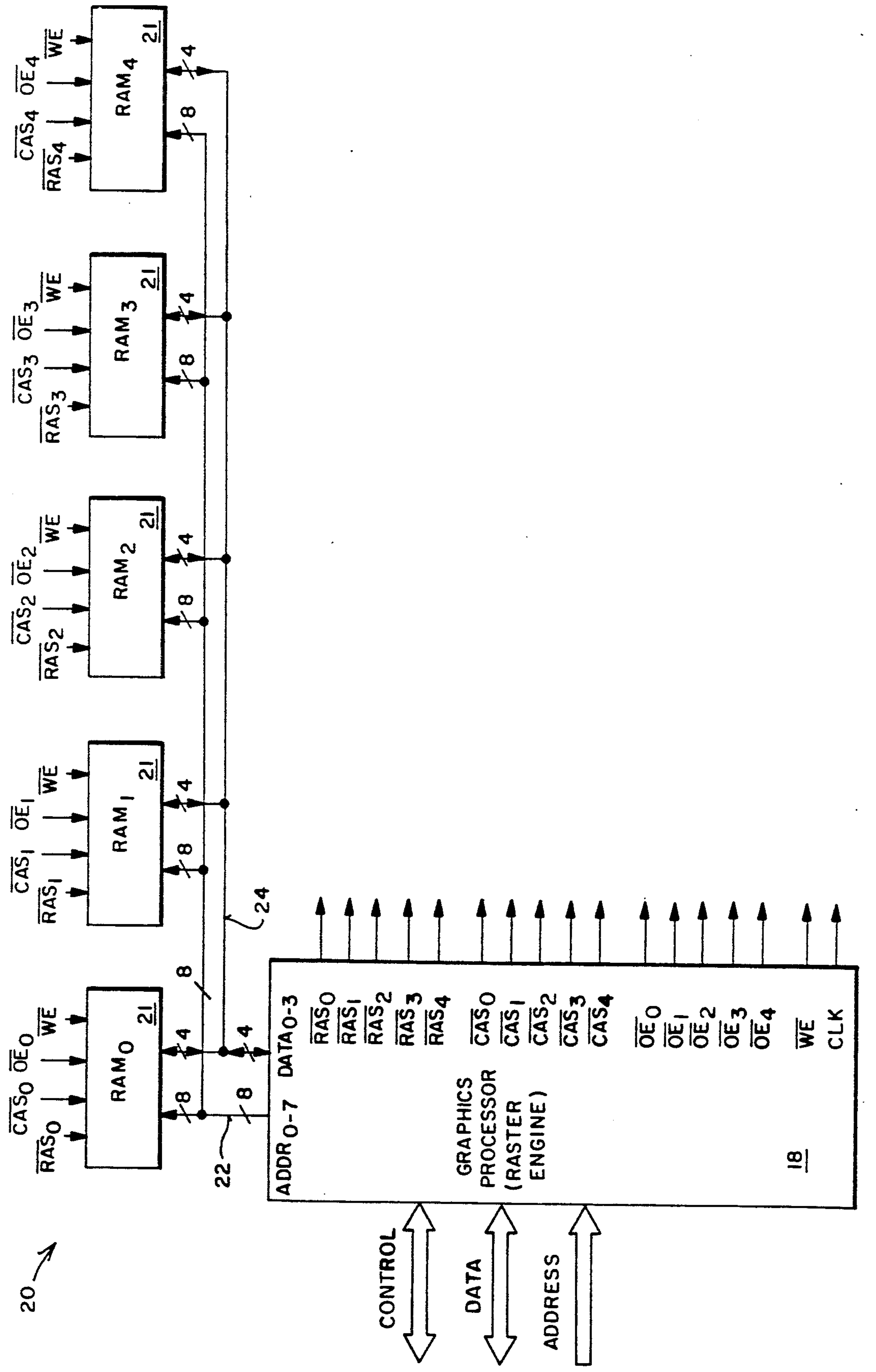
FIG. 2 is a circuit schematic diagram of a graphics processor and a memory of the present invention.

Referring to FIG. 2, the raster engine 18 is shown coupled to a memory 20. Memory 20 can be either the image buffer 15 or the Z-buffer 14 of FIG. 1. Memory 20 is comprised of a plurality of RAMs 21, each being a separate memory unit. RAMs 21 can be of a variety of random-access-memories, such as video random-access-memories (VRAMs) or dynamic random-access-memories (DRAMs). Combinations of memories can also be used. For example, VRAMs can be used with the image buffer 15 while DRAMs can be used with the Z-buffer 14. In the specific example shown in FIG. 2, memory 20 is comprised of five RAM chips 21, $RAM_0$–$RAM_4$, however, the actual number of RAM chips 21, is strictly a design choice. The various control, data and address signals to raster engine 18 are provided by the host processor 11 and geometry engine 13 as explained above.

The address signals which are used to address locations of the various RAMs 21 are provided by the raster engine 18 on address bus 22. An 8-bit address signal $ADDR_{0-7}$ is coupled to all of the RAMs 21 on address bus 22. A bidirectional data bus 24 couples data between the raster engine 18 and RAMs 21. In the preferred embodiment, bus 24 transfers four bits of data. It is to be appreciated that the actual number of bits for the address and data is a design choice.

The raster engine 18 provides a separate RAS signal to each RAM 21 of memory 20. Because there are five RAMs, $RAM_0$–$RAM_4$, in memory 20 of FIG. 2, five separate RAS/ (/ is hereinafter used to denote a low activate condition) signals are provided. $RAS_0$/ to a first RAM, $RAS_1$/ to the next RAM, etc., such that each of $RAS_0$/–$RAS_4$/ is coupled to $RAM_0$–$RAM_4$, respectively.

The raster engine 18 also provides a separate CAS/ signal for each RAM 21 of memory 20. Accordingly, $CAS_0$/ is coupled to activate $RAM_0$, $CAS_1$/ to active $RAM_1$, etc. Further, a separate output enable signal is provided to each RAM 21. The output enable signals $OE_0$/–$OE_4$/ are utilized to read data from $RAM_0$–$RAM_4$, respectively. Additionally, a write enable signal WE/ is coupled to all of the RAMs of the memory array for writing data into RAMs 21, and a clock singal CLK to provide the clock timing to memory 20.

In operation, the raster engine operates as a graphics update processor to write video image information into memory 20. The following discussion is based on memory 20 being the image buffer 15 of FIG. 1, wherein information representing a whole frame of the display is written into memory 20 during an update cycle and read from memory 20 during a display cycle. Although various schemes are available, the present invention maps out pixel information for a raster scan so that each subsequent pixel data from memory 20 represents pixel information for the very next pixel of scan line. Further, data for a pixel is represented by the four bits of data transferred on bus 24. It is to be stressed that each of the RAMs 21 comprising memory 20 is structured to have memory cells arranged in an array. A row address and a column address are needed to access a given memory location in each RAM 21. RAMs which require now and column addresses to select a given memory location to be accessed are well-known in the prior art.

A given memory storage location for a given RAM 21 is selected when it has obtained its row address and its column address. The row address is latched into a given RAM chip 21 when its RAS/ signal goes low and the column address is latched in when its CAS/ signal goes low. A row address and a column address are provided by the raster engine 18 to the RAMs 21. Row and column addresses are time multiplexed and provided on address bus 22. When row and column addresses are provided to given RAM 21, data on data bus 24 is written into the RAM, if WE/ is low. Conversely, when row and column addresses are provided to a given RAM 21, data is read onto bus 24 from that RAM 21 if OE/ is low.

Although the same WE/ signal is coupled to all RAMs 21, a separate OE/ signal is coupled to each of the RAMs 21, $OE_0$/ to $RAM_0$, $OE_1$/ to $RAM_1$, etc. In the preferred embodiment, the separate OE/ signals control which RAM 21 is to output data onto bus 24 during a read operation.

The use of separate RAS/, CAS/ and OE/ lines to control memory 20 allows independent control of each RAM 21 of memory 20. This flexibility in RAM 21 selection increases the pixel update rate despite relatively slow memory cycle times and achieves an increase in the overall memory bandwidth. For example, a prior art frame buffer structured somewhat similar to the structure of the present invention, but not having the separate RAS/ and CAS/ signals, will have a bandwidth limitation based on the memory device used. This is also true of multiple RAS structures where only one chip is cycled at a time during a memory cycle. Because of the large memory requirement of placing an image frame in the buffer, low cost DRAMs are normally used. These DRAMs typically have random address cycle times on the order of 300 nanoseconds. With a single update processor the memory bandwidth is determined by the 300 nanosecond limitation.

That is, if the same RAS/ and CAS/ are coupled to all of the DRAMs, data can be transferred each 300 nanoseconds. However, the individual RAS/, CAS/ and OE/ control lines of the present invention permit independent control of each of the RAMs 21 and allow data transfer between individual RAMs 21 of memory 20 to be staggered. Even though the random address cycle time for each of the RAMs 21 is on the order of 300 nanoseconds, allowing each RAM 21 of memory 20 to read or write different data each 300 nanoseconds, the RAMs 21 need not all write or read at the same time. The individual RAS/ and CAS/ lines provide for staggered strobing of its corresponding RAMs 21, so that data or address transfer to the various RAMs 21 can be achieved at staggered intervals. Therefore, the overall data transfer rate is much less than the 300 nanosecond limitation of the device. Examples of using the staggered RAS/, CAS/ and OE/ timing is discussed later in reference to FIGS. 3–6.

Although the pixel information can be stored in memory 20 in a variety of ways, the present invention provides for a fairly standard method of sequentially storing pixel information. For example, to store pixel information into memory 20, for a scan line of a display, a given row and column address, such as $R_0C_0$, are provided to all five RAMs 21. Then, data for the first pixel is inputted to the first RAM, $RAM_0$, data for the second pixel to the second RAM, $RAM_1$, etc. Therefore, data representing pixel information for the first five pixels of the scan line are inputted to $RAM_0$–$RAM_4$, respectively. Then, the next column address is provided to the RAMs 21 so that the memory location addressed is $R_0C_1$ and the next five pixel information of the scan line are inputted to $RAM_0$–$RAM_4$, respectively. In the example of FIG. 2, each pixel information is comprised of four bits. However, the actual number of bits is a design choice.

Using the staggered scheme of the present invention the same data can be inputted to the same locations of each of the RAMs 21 of memory 20. Because address and data can be placed on the address bus 22 and data bus 24, respectively, at a much faster rate than the cycle time of each of the RAMs 21, the present invention takes advantage of this faster information transfer rate. For example, the same row and column address signals can be provided to $RAM_0$–$RAM_4$, then the data representing the first pixel information is put on data bus 24 and written into $RAM_0$. Next, the second pixel information is placed on data bus 24 and written into $RAM_1$, until each of the five pixel information are written into the $RAM_0$–$RAM_4$, respectively. By properly staggering the RAS/ and CAS/ signals to each of the RAMs 21, data input to each of the RAMs 21 can be staggered. Although each of the RAMs will accept a data every 300 nanoseconds, the combined data transfer is at a much faster rate.

Hypothetically, data representing new pixel information can be placed on data bus 24 every 60 nanoseconds for sequentially inputting to the five RAMs 21 of memory 20. This 60 nanosecond stagger allows five data transfers during a 300 nanosecond period. With this hypothetical example, data transfer occurs every 60 nanoseconds, however, each RAM has a memory cycle time of 300 nanoseconds. It is appreciated that the 60 nanosecond timing is presented for illustrative purpose only. In actual practice, this timing will vary appreciably due to the processor and associated circuitry used. Three examples of using the staggered RAS/, CAS/, and OE/ timing is shown in the examples of FIGS. 3–6. These examples are for illustrative purpose only and illustrate some of the advantages of practicing the present invention.

Figure 3:
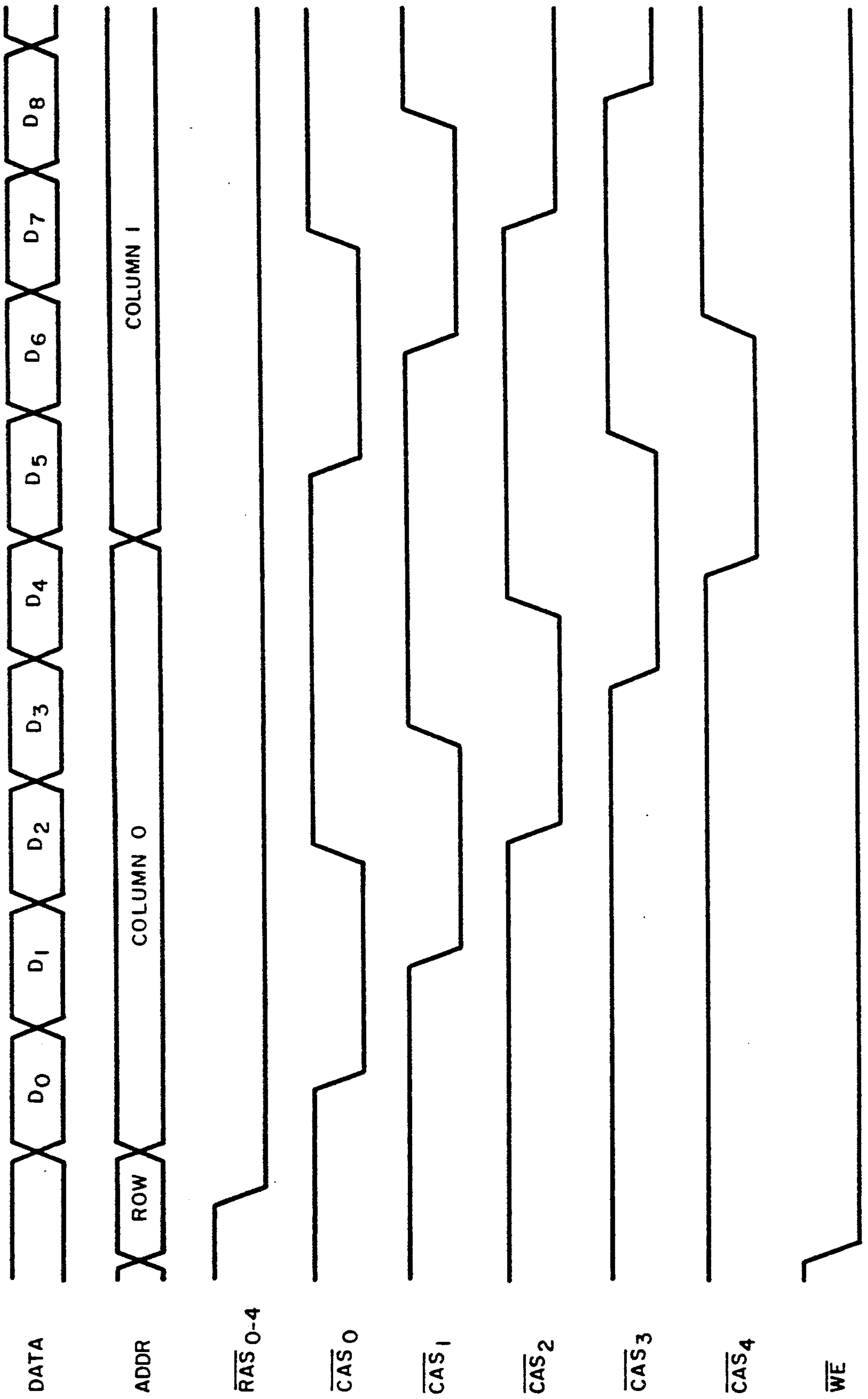
FIG. 3 is a timing diagram showing the use of staggered CAS signals to write data into the memory.

Referring to FIG. 3, a signal timing diagram for performing a smooth-shaded horizontal scan line filling operation is shown. In this instance, each RAM 21 of memory 20 contains data for every fifth pixel across the scan line, wherein the shading of the pixels are performed by a smooth-shaded scan line filling operation. For this operation, the row address and the column address are the same for all five RAMs 21. $RAS_0$/–$RAS_4$/ will have the same timing to latch in the same row address. The row address is strobed into $RAM_0$–$RAM_4$ at the same instant of time after the row address is provided on bus 22. However, the CAS/ strobe of each RAM 21 is staggered to allow different data to be written into each RAM 21 of memory 20. As can be seen in the diagram, once a first column address is provided on the address bus 22, $CAS_0$/–$CAS_4$/ timing is staggered to coincide with data $D_0$–$D_4$ on the data bus 24, such that $D_0$ is written to $RAM_0$ of memory 20, $D_1$ to $RAM_1$, etc. Then, a second column address is provided on bus 22 (the row address has not been changed) and the staggered $CAS_0$/-$CAS_4$/ are repeated to write in data $D_5$-$D_9$ to $RAM_0$-$RAM_4$, respectively. During the period that data is being written in, WE/ is low and all OE/ lines are high. After the column addresses have been cycled, then the row address is incremented and the column addresses are again cycled.

Figure 4:
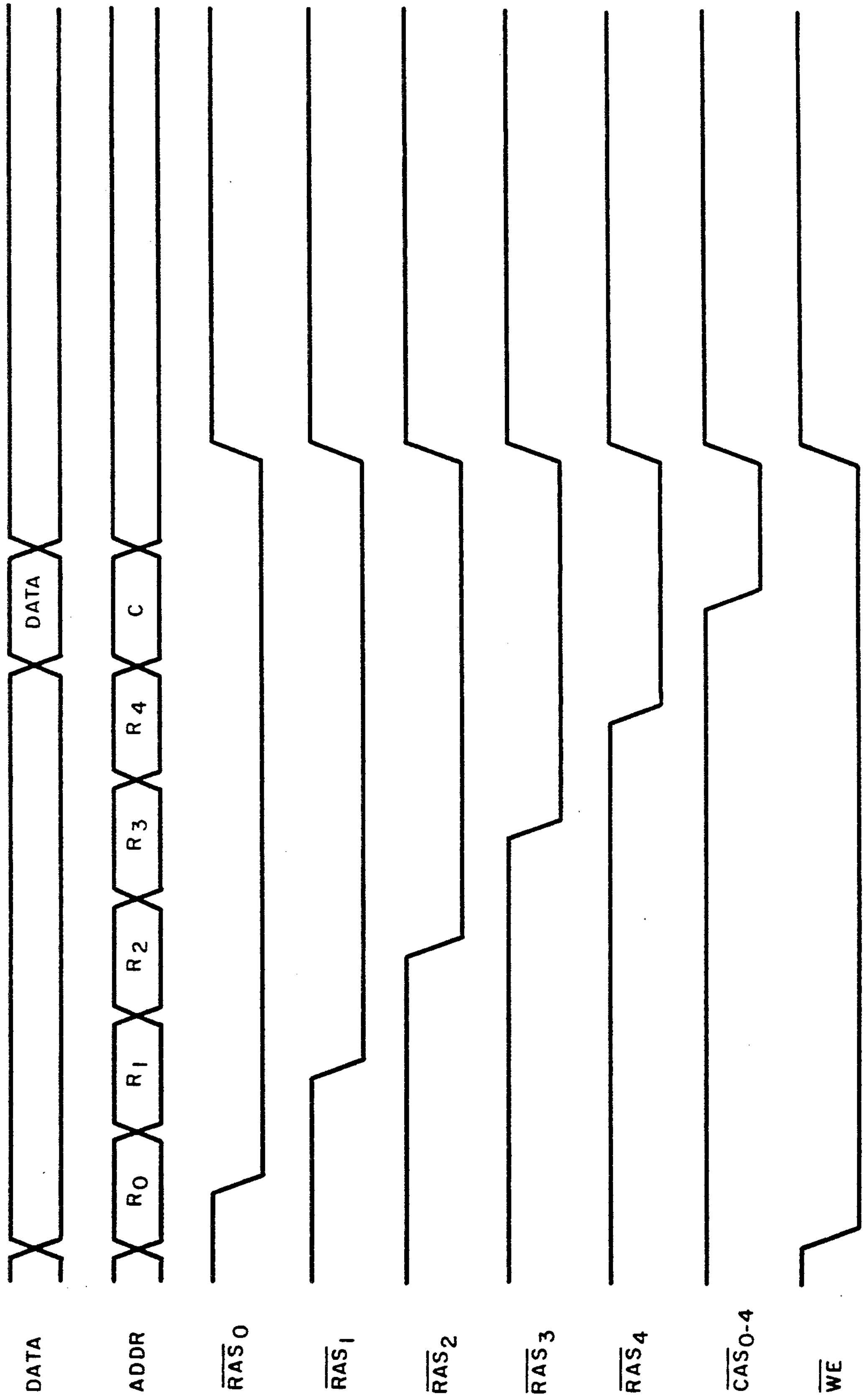
FIG. 4 is timing diagram showing the use of staggered RAS signals to write data into the memory.

Referring to FIG. 4, an example of using staggered RAS/ signals is shown. For example, when drawing lines on a display, the data written at each pixel is typically the same sequential pixels along the line, but do not necessarily fall at the same row address. If the line has a slope magnitude of not greater than one, then the same data for the line can be provided to different row addresses. In this instance, five row addresses $R_0$/-$R_4$/ are presented in sequence on the address bus 22 and RAS signals $RAS_0$/-$RAS_4$/ are staggered to latch address $R_0$ to $RAM_0$, $R_1$ to $RAM_1$, etc. Then a column address is presented on the address bus 22, as well as valid data on the data bus 24. Then all of the CAS/ strobes go low to strobe in the column address C0 and the same data is written into each of the RAMs 21. The different row addresses for $RAM_0$-$RAM_4$ causes the same data to be written to different row addresses of each $RAM_0$-$RAM_4$, so that a line with a slope can be represented without changing the data. Again WE/ remains low.

Figure 5:
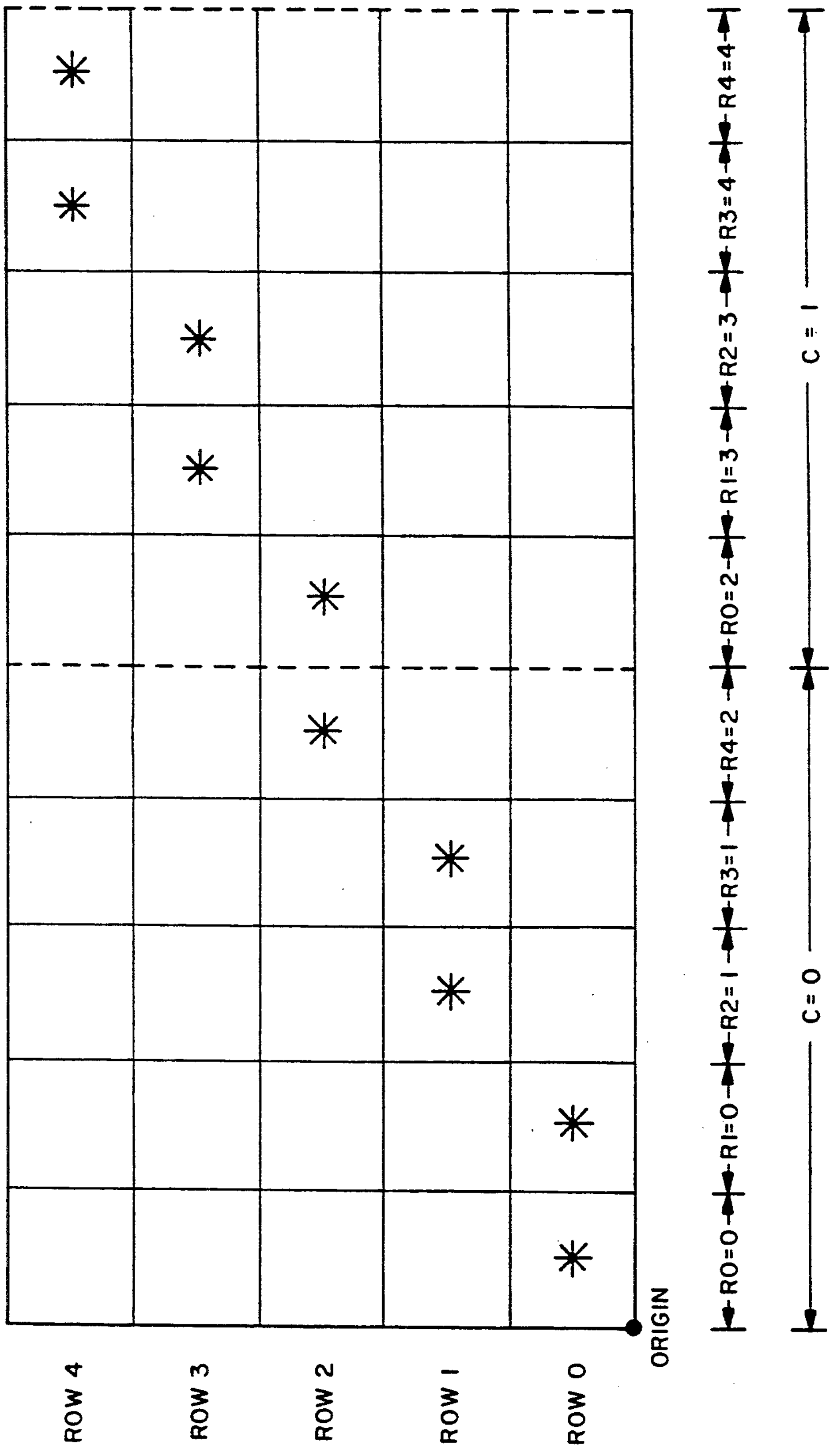
FIG. 5 is a graphic illustration showing an example of pixels being written to various address locations for representing a sloped line.

Once such example of providing data to various row addresses for drawing a line having a slope is shown in FIG. 5. The timing diagram of FIG. 4 is used to load the address and data to $RAM_0$-$RAM_4$. In this example, the data remains the same because it represents the drawing of a line. Address signal R0 provides address location for row 0 in $RAM_0$. Next, address information $R_1$ also provides location row 0 in $RAM_1$. In $RAM_2$ the $R_2$ address is row 1 and row 1 address is also provided to $RAM_3$. $R_4$ provides the address location for row 2 to $RAM_4$. Then, the same column location is strobed into all of the RAMs 21 at which point the same data is read into these five locations. Next, address signals $R_0$-$R_4$ are repeated. Row 2 address location is provided to $RAM_0$, row 3 address locations to $RAM_1$ and $RAM_2$, and row 4 address locations to $RAM_3$ and $RAM_4$. Then, the next column location is strobed to all RAMs 21. Assuming that each row address provides for a scan line of the display, the same data is mapped to provide a sloped line on the display. It is apparent that variations to this sloped line can be readily implemented without departing from the spirit and scope of the present invention.

Figure 6:
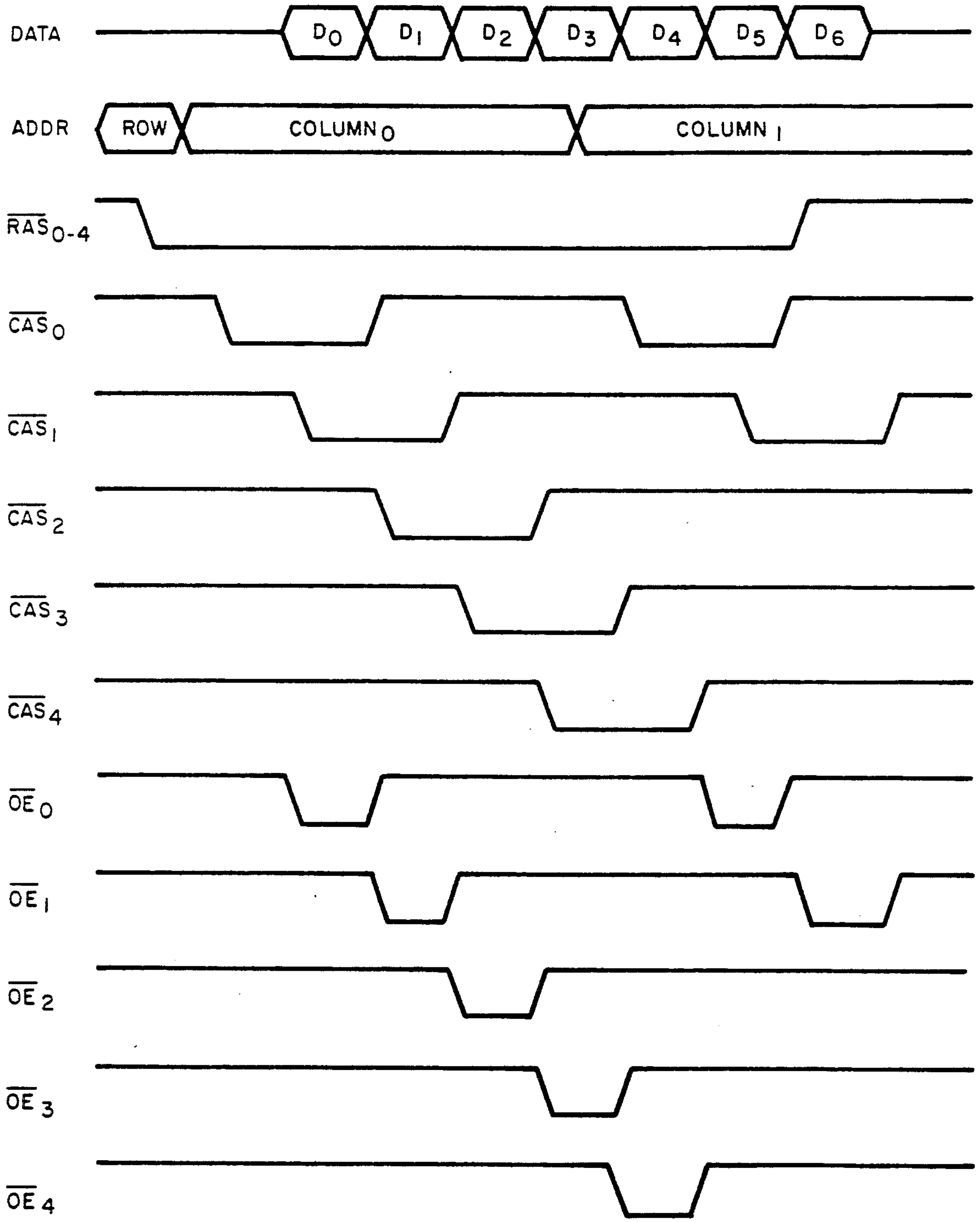
FIG. 6 is a timing diagram showing the use of staggered CAS and OE signals for reading data from the memory.

Referring to FIG. 6, a final example is shown using staggered CAS/ and OE/ signals for reading data from memory 20. This example is the converse of the writing example of FIG. 3. A same row address is latched into all RAMs 21 at the same time. Then, a column address is latched into each RAM 21 in a staggered fashion. $CAS_0$/ reads in the column address to $RAM_0$. Then, after $CAS_0$/ is low, $OE_0$/ goes low and data $D_0$ corresponding to the four bits stored in $RAM_0$ is read onto data bus 24. While this is occurring, $CAS_1$/ goes low to read in the column address to $RAM_1$. Only after $OE_0$/ goes high to release the data line, $OE_1$/ goes low to output $D_1$ from $RAM_1$. This sequence is then repeated for the rest of the RAMs, $RAM_2$-$RAM_4$, where upon the column address on the address line changes and the output sequence is repeated. Because this is a read operation the WE/ signal remains high. After all columns have been read, the row address is changed. Also, in the preferred embodiment, the CAS/ and OE/ signals of a given RAM 21 goes high at the same time.

As can be seen from the examples, the staggering of the RAS/, CAS/ and OE/ signals increases the overall amount of data transfer which can be achieved per memory cycle. The data transfer rate of the present invention increases the data transfer of the memory beyond the transfer cycle rate of a particular RAM chip used. Further, special operations, such as displaying a sloped line, can be easily achieved by changing row and/or column addresses to individual RAM chips.

It is to be appreciated that the examples are provided for illustrative and explanatory purpose and not for the purpose of limiting the invention. Further, it is to be appreciated that variations in the structure of the buffer can be readily achieved, such as changing its size, without departing from the spirit and scope of the present invention.

Figure 7A:
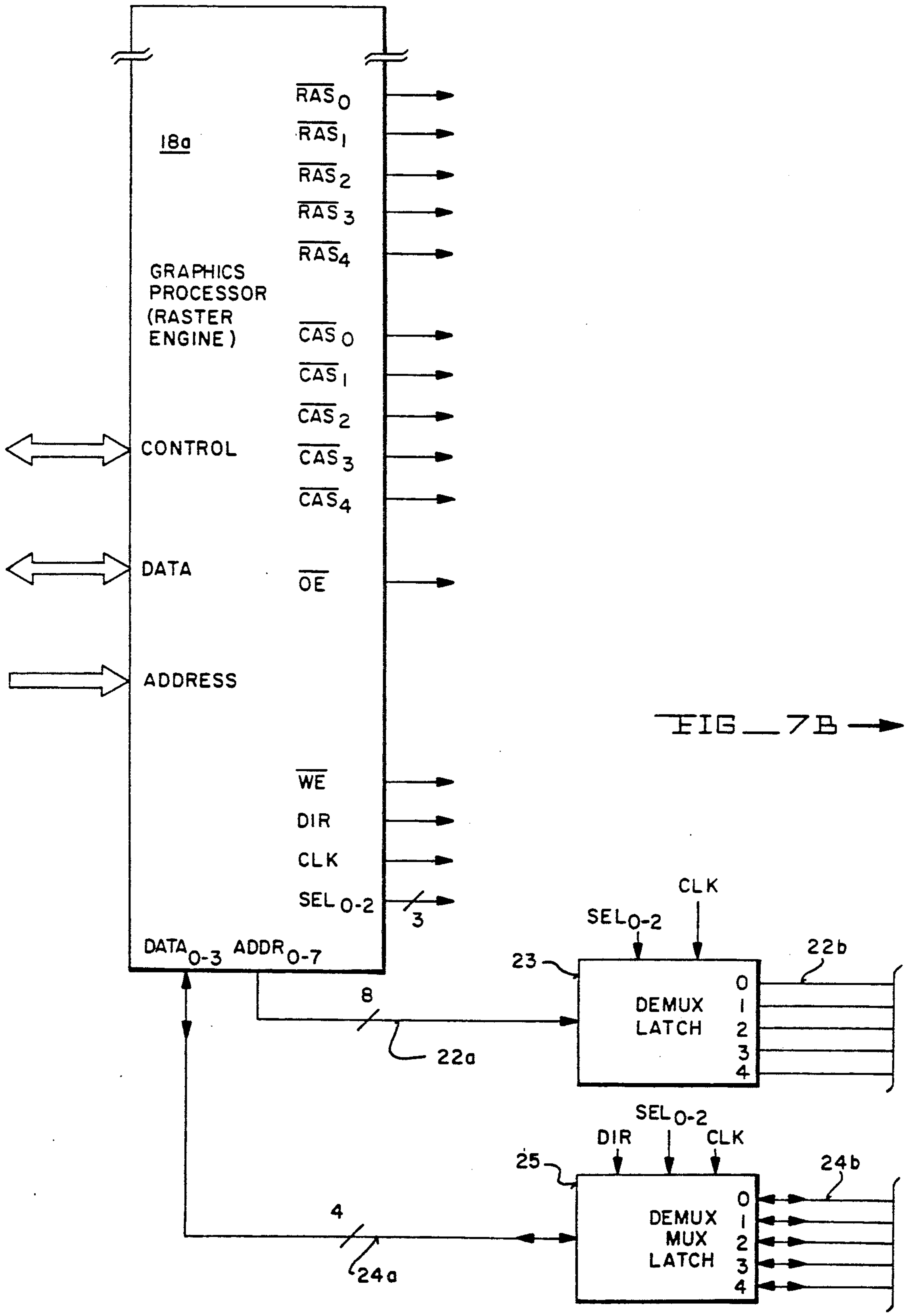
FIGS. 7A, 7B and 7C show a circuit schematic diagram of a graphics processor and a memory array of an alternative embodiment using data and address switches.
Figure 7B:
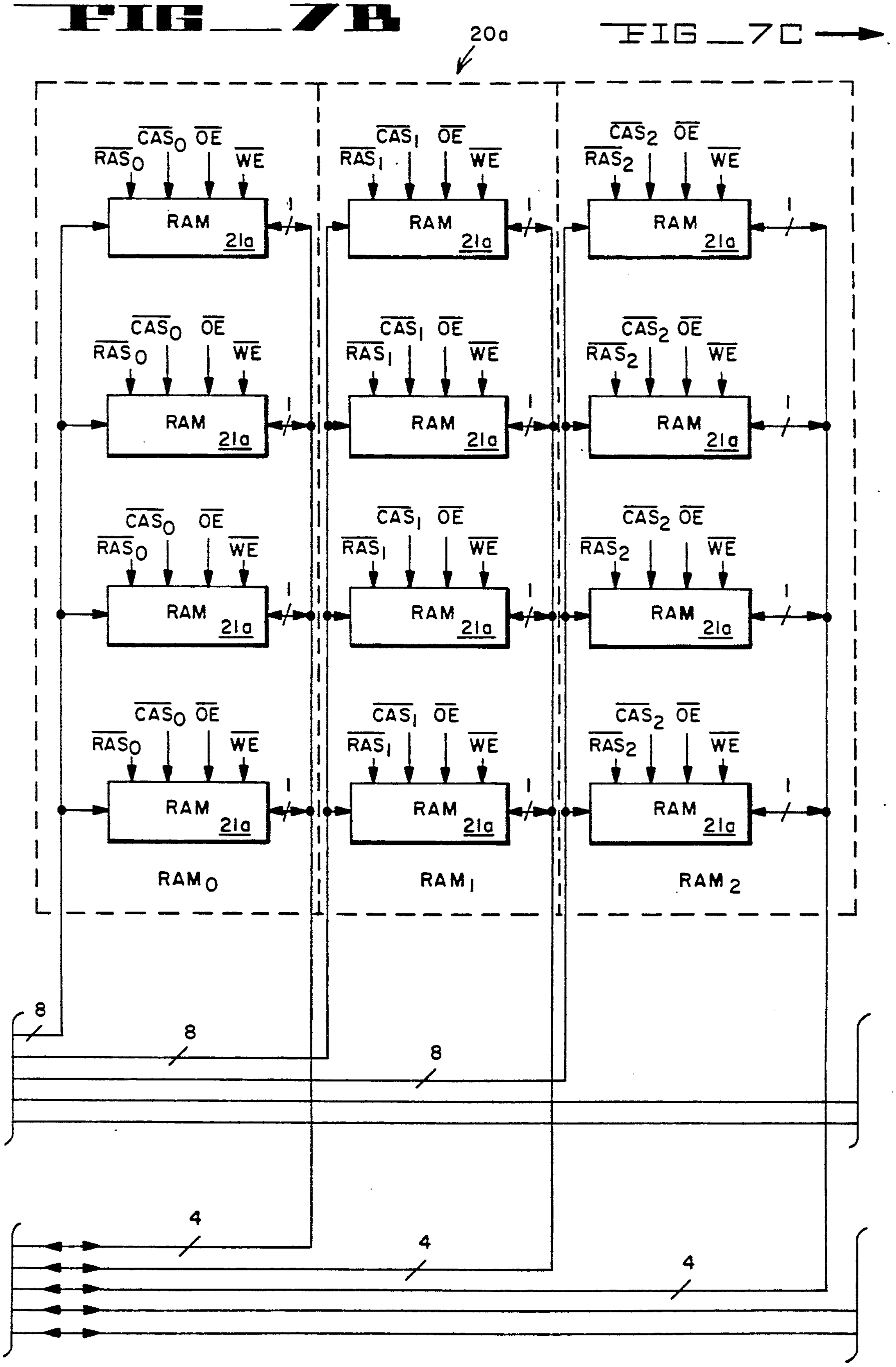
Figure 7C:
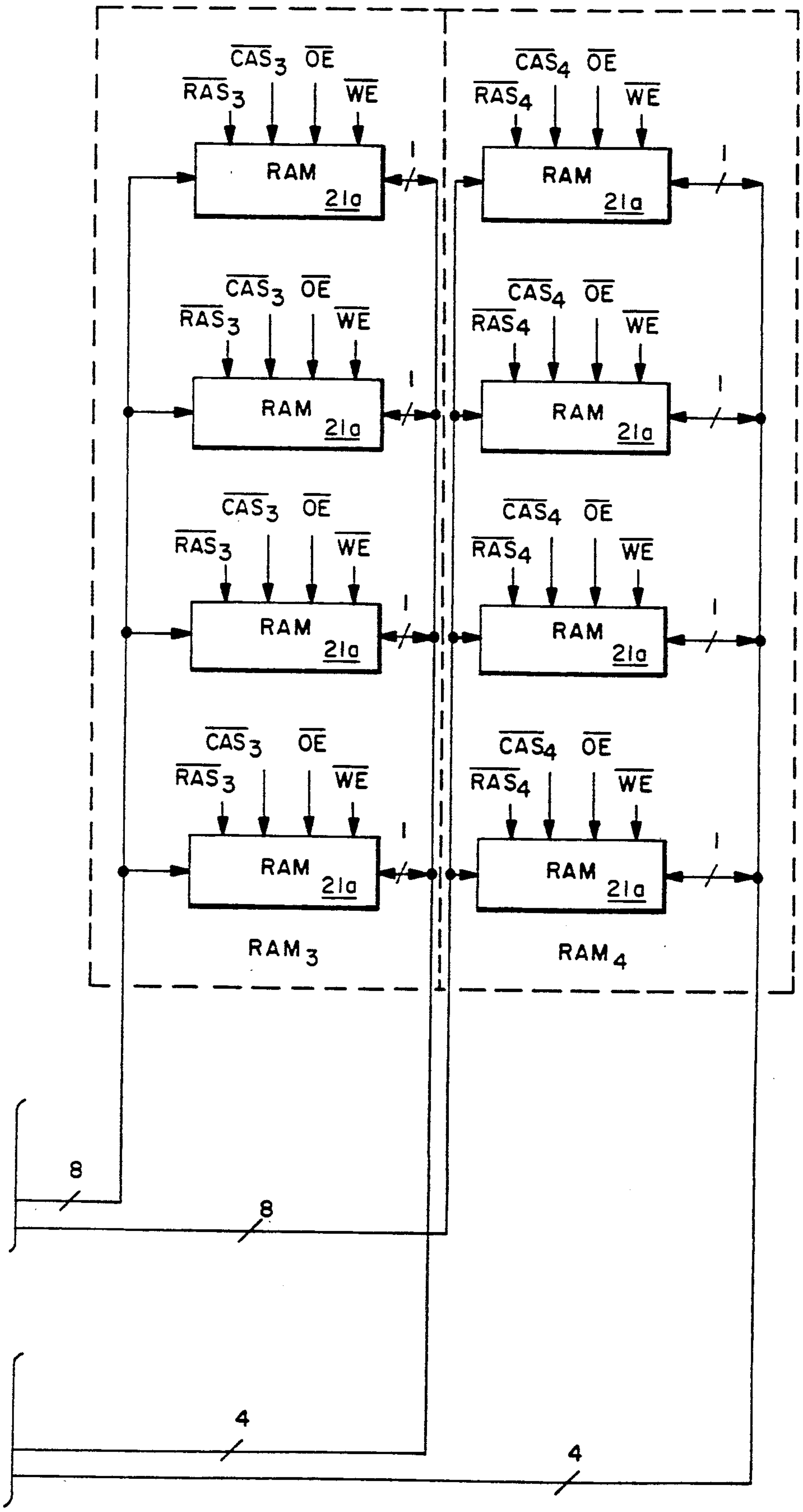

Referring to FIGS. 7A, 7B and 7C, an alternative embodiment of the present invention is shown. The raster engine 18*a* is shown coupled to a memory 20*a*. Raster engine 18*a* is equivalent to raster engine 18 of FIG. 2 except that two new signals DIR and $SEL_{0-2}$ are now provided by raster engine 18*a*. Further, the individual output enable signals of FIG. 2 are now consolidated to a single output enable signal OE/. Memory 20*a* is equivalent to memory 20 of FIG. 2 except that each RAM 21 of FIG. 2 is now represented by four separate RAM chips 21*a*. That is, $RAM_0$-$RAM_4$ are each comprised of four seperate RAM chips 21*a*. Instead of coupling address and data signals directly to RAMs 21*a*, these signals are coupled through two switcher units.

The eight bit address signal $ADDR_{0-7}$ is coupled from raster engine 18*a* onto address bus 22*a*. Address bus 22*a* couples the eight bit address signal to an address switcher unit 23. Switcher unit 23 includes a one-to-five demultiplexor (DMUX) and a latch so that the address signal $ADDR_{0-7}$ can be provided onto each of the output 0-4 and onto each of address buses 22*b* of switcher unit 23 at various time intervals. Each address bus 22*b* from address switcher unit 23 is coupled to RAM chips 21*a* of its corresponding RAMs, $RAM_0$-$RAM_4$. The address switcher unit 23 can selectively place address signal $ADDR_{0-7}$ onto any one or all of the buses 22*b*. This switching operation by the address switcher unit 23 allows the row address and/or the column address to be provided to one or all of $RAM_0$-$RAM_4$. A selection signal $SEL_{0-2}$ and a clock signal CLK are provided by the raster engine 18*a* and coupled to unit 23 for the purpose of selecting and clocking the address signal onto the five buses 22*b*. The three bit $SEL_{0-2}$ signal controls the switching of the $ADDR_{0-7}$ signal onto one or all of the buses 22*b*.

A bidirectional data bus 24*a* couples a four bit data, $DATA_{0-3}$, between the raster engine 18*a* and a data switcher unit 25. Data switcher unit 25 is comprised of a one-to-five DMUX, a five-to-one multiplexor (MUX) and a latch. Five data buses 24*b* couple data switcher unit 25 to memory 20*a*. Each individual bus 24*b*, designated 0-4, are coupled to each of $RAM_0$-$RAM_4$. In this example, each RAM chip 21*a* of a given RAM stores one bit of $DATA_{0-3}$. The buses 24*b* are also bidirectional buses.

When data is being written into memory 20*a*, unit 25 operates equivalently to that of unit 23 by providing data from the raster engine 18*a* onto one or all of the buses 24*b* at various different time periods. The $SEL_{0-2}$ and CLK signals are also coupled to unit 25 for providing this operation. When data is provided onto one of the buses 24*b* then that data is coupled to one of $RAM_0$–$RAM_4$. However, when data is coupled to all five buses 24*b*, then, data is provided to all of $RAM_0$–$RAM_4$.

Because the data buses 24*b* are also bidirectional, the five-to-one MUX is included for the purpose of multiplexing the data on the five data buses 24*b* onto data bus 24*a*. A DIR signal is provided by the raster engine 18*a* and coupled to unit 25 for the purpose of selecting the direction of data transfer. It is to be appreciated that although eight bits are provided for the address and four bits are provided for the data, the actual number of bits is a design choice.

The raster engine 18*a* provides a separate RAS/ signal and a separate CAS/ signal to each of the RAMs, $RAM_0$–$RAM_4$. $RAS_0$/ and $CAS_0$/ are provided to all RAM chips 21*a* of $RAM_0$. $RAS_1$/ and $CAS_1$/ are provided to all RAM chips 21*a* of $RAM_1$, etc., so that each $RAM_{0-4}$ has its individual RAS/ and CAS/ signals. A write enable signal WE/ and an output enable signal OE/ are coupled to all of the RAM chips 21*a*. The operation of the RAS/ and CAS/ signals are equivalent to that described above in reference to the preferred embodiment of FIG. 2. In this instance, the row and column addresses are provided to all RAM chips 21*a* of each $RAM_0$–$RAM_4$. The WE/ signal operates equivalently also and allows writing of data to memory 20*a* when WE/ is low. When the OE/ signal goes low, data is read from RAM chips 21*a* of memory 20*a*. Individual output enable lines are not necessary with the circuit of the alternative embodiment because separate data buses 24*b* are utilized for each $RAM_0$–$RAM_4$. Therefore, data can be outputted from all RAMs and data can remain on each of the buses 24*b* and will not interfere with data on the other buses 24*b*.

In operation, the same functions shown in FIGS. 3–6 can be readily implemented in the alternative embodiment of FIG. 7, except that separate output enable signals are not utilized, so that in the diagram of FIG. 6, the output enable line will be low during the whole time data is being read from memory 20*a*. In reference to FIG. 3, the row address on bus 22*a* is coupled to all five buses 22*b* by address switcher unit 23. This row address is then read into $RAM_0$–$RAM_4$. Then, column address is coupled to all five address buses 22*b*. When data $D_0$ is placed on bus 24*a*, data switcher unit 25 selects output 0 and couples this data to $RAM_0$ at which point $CAS_0$/ goes low and inputs data $D_0$ into the four RAM chips 21*a* of $RAM_0$. Next data $D_1$ is placed on output 1 of unit 25 for coupling data $D_1$ to $RAM_1$, etc., so that data $D_0$–$D_4$ are inputted to $RAM_0$–$RAM_4$ in a staggered fashion.

In reference to FIG. 4, the address switcher unit 23 switches row address locations $R_0$–$R_4$ to each of the outputs 0–4 so that R0–R4 are coupled to $RAM_0$–$RAM_4$, respectively. Then the RAS/ signals are staggered to input the row addresses.

In reference to FIG. 6, the same row and column signals are provided to all of $RAM_0$–$RAM_4$. CAS/ strobing is staggered so that data from each $RAM_0$–$RAM_4$ are read out onto its data bus 24*b*. Switcher unit 25 selects one of the inputs 0–4 at a time so that data from buses 24*b* is coupled to data bus 24*a* in a selective and staggered fashion.

It is to be appreciated that data switcher unit 25 can be used alone without the use of the address switcher unit 23. Further, it is to be appreciated that the structure of memory 20*a* comprised of five $RAM_0$–$RAM_4$, wherein each RAM is comprised of four separate RAM chips 21*a*, can be altered to have different size and dimension without departing from the spirit and scope of the present invention.

Figure 8:
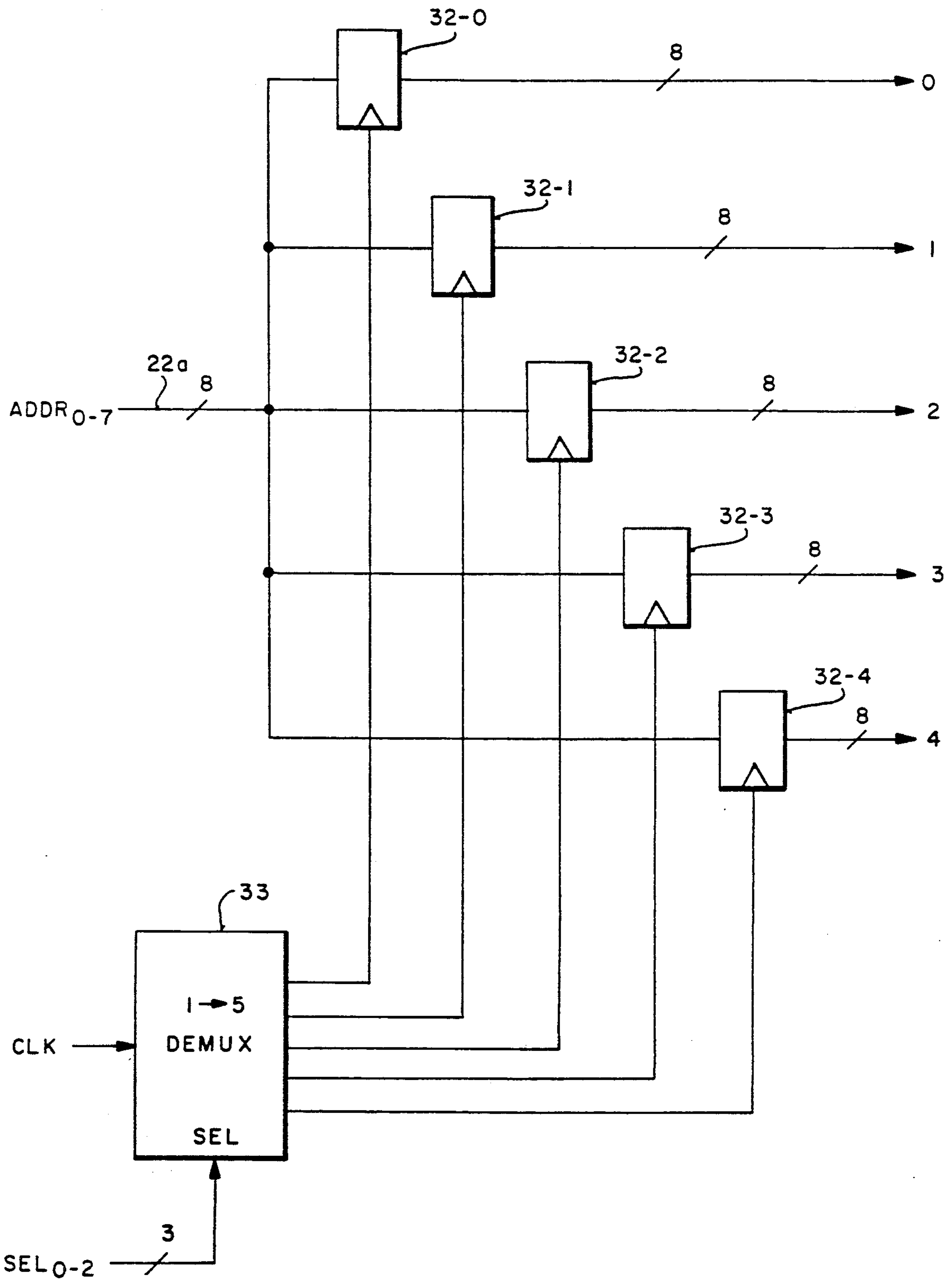
FIG. 8 is a circuit schematic diagram of an address switcher of the present invention.

Referring to FIG. 8, the address switcher unit 23 of FIGS. 7A–7C is shown in greater detail. The eight bit address signal, $ADDR_{0-7}$, is coupled to each of the latches 32-0 through 32-4. Each of the latches 32 is capable of latching the eight bit address. The latches are coupled to provide outputs 0–4 from unit 23. The clock signal, CLK, is coupled to the one-to-five DMUX 33 and each of the five outputs of DMUX 33 is coupled to clock respective latches 32. The select signal $SEL_{0-2}$ is coupled to the DMUX 33 and the three-bit select signal is used to switch the clock signal to one or all of the latches 32. Simply by changing the select code $SEL_{0-2}$, the corresponding output of DMUX 33 can be made to change its state to latch the address signal onto one or all of the outputs 0–4. The timing of the changing of the select signal can be adjusted to set the cycle timing for placing the address signal onto the corresponding output bus 0–4.

Figure 9:
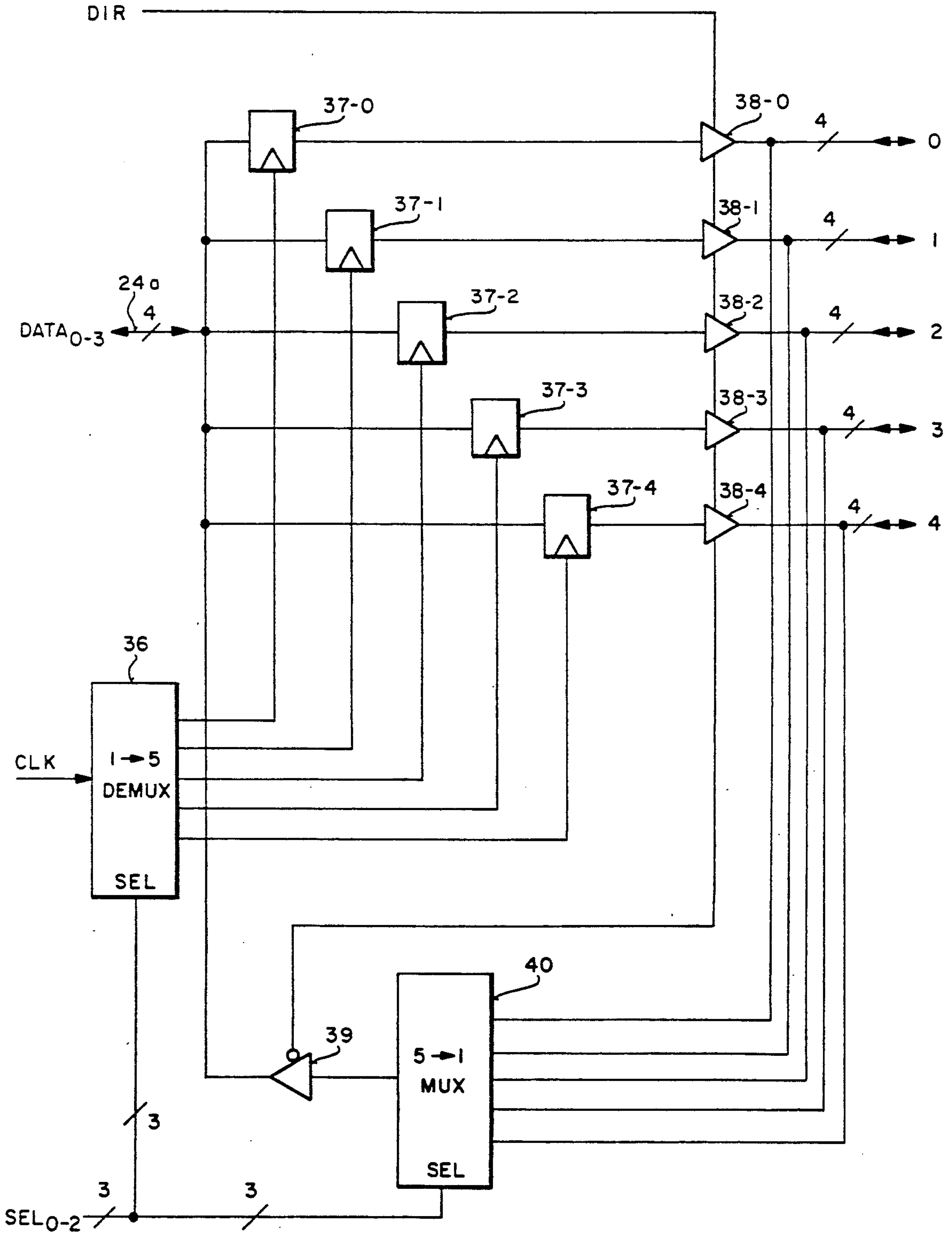
FIG. 9 is a circuit schematic diagram of a data switcher of the present invention.

Referring to FIG. 9, the data switcher unit 25 of FIGS. 7A–7C is shown in detail. The $DATA_{0-3}$ which is to be written into memory 20*a* is coupled to the five latches 37-0 through 37-4. Each of the five latches 37 are capable of latching all four of the data bits. The CLK signal is coupled as an input to the one-to-five DMUX 36, wherein the select signal $SEL_{0-2}$ switches the clock signal to latch $DATA_{0-3}$ to one or all of the output buses 0–4. The DMUX 36 operates to control each of the latches 37 in the same manner as did DMUX 33 to latches 32 in FIG. 8. However, the output of the latches 37 are coupled to the output 0-4 through corresponding drivers 38-0 through 38-4. Drivers 38 are tri-statable drivers, such that the output from the latches are only coupled to the outputs 0–4 only if drivers 38 are active.

Because the data buses are bidirectional, a MUX 40 is used to read the data from the memory 20*a* for coupling to the raster engine 18*a*. The data from memory 20*a* are inputted to MUX 40 and the input selected by the select signal $SEL_{0-2}$ is coupled as an output from MUX 40 through tristatable driver 39 to the data bus 24*a* for input to the raster engine 18*a*. The direction signal, DIR, is coupled to the drivers 38 and 39 for controlling the direction of data flow. That is, when DIR is high, data is coupled from latches 37 to memory 20*a* and when DIR is low, data from memory 20*a* is coupled to the raster engine 18*a*.

As was the case with the address switcher unit 23, $DATA_{0-3}$ can be coupled to one or all of the RAMs, $RAM_0$–$RAM_4$, of memory 20*a* by using $SEL_{0-2}$ signal to provide the selection. During a read operation, four bits of data is read from each $RAM_0$–$RAM_4$ and $SEL_{0-2}$ selects the sequence in which this five sets of four bit data is to be coupled to the raster engine 18*a*.

It is to be appreciated that other embodiments of switcher units 23 and 25 can be implemented without departing from the spirit and scope of the invention.

Thus, a graphics processor with staggered memory timing is disclosed.

I claim:

1. An apparatus for storing digital pixel data for a display, comprising:

a plurality of memories accessed by row address data and column address data within a memory cycle;

a processor coupled to said memories;

an address bus coupled to said processor and said memories for coupling said row address data and said column address data from said processor to said memories for accessing locations in said memories;

a data bus coupled to said processor and said memories for coupling data between said processor and said memories;

said processor providing a separate row address strobe (RAS) signal and a separate column address strobe (CAS) signal to each of said memories, each of said RAS signals and each of said CAS signals being independently provided by said processor and independently coupled to said memories;

all of said RAS signals individually capable of having associated row address data which is unique from all other row address data associated with other RAS signals within said memory cycle and all of said CAS signals individually capable of having associated data which is unique from all other data associated with other CAS signals within said memory cycle;

wherein staggered timing of either said RAS signals or CAS signals causes said memories to be accessed in a staggered fashion to transfer data between said processor and said memories.

2. The apparatus of claim 1, wherein said data bus is a bidirectional data bus.

3. The apparatus of claim 2, wherein said processor provides a write enable signal coupled to all of said memories for writing data into said memories.

4. The apparatus of claim 3, wherein said processor provides a separate output enable signal to each of said memories, wherein activation of each of said separate output enable signals in a staggered fashion causes data to be read from its corresponding memory so that data can be read from said memories in a staggered fashion.

5. The apparatus of claim 3, further including a data switcher coupled onto said data bus for distributing said data to each memory, such that data is written to each memory at different time periods.

6. The apparatus of claim 5, wherein said data switcher controls direction of data transfer between said processor and said memories and wherein a direction control signal is provided by said processor to said data switcher for controlling direction of said data transfer.

7. The apparatus of claim 6, further including an address switcher coupled onto said address bus for distributing said addresses to each memory at different time periods.

8. The apparatus of claim 4, wherein said memories are random-access-memories.

9. The apparatus of claim 4, wherein said memories are dynamic-random-access memories.

10. In a graphics display system having a host processor which provides instructions for providing an image to be displayed, an apparatus for providing pixel information for a raster scan display having pixels arranged in a plurality of horizontal lines to form said raster scan display, comprising:

a plurality of memories accessed by row address data and column address data within a memory cycle;

a graphics processor coupled to said memories;

an address bus coupled to said graphics processor and said memories for coupling said row address data and said column address data from said graphics processor to said memories for accessing locations in said memories;

a data bus coupled to said graphics processor and said memories for coupling data between said graphics processor and said memories;

said graphics processor providing a separate row address strobe (RAS) signal and a separate column address strobe (CAS) signal to each of said memories, each of said RAS signals and each of said CAS signals being independently provided by said graphics processor and independently coupled to said memories;

all of said RAS signals individually capable of having associated row address data which is unique from all other row address data associated with other RAS signals within said memory cycle and all of said CAS signals individually capable of having associated data which is unique from all other data associated with other CAS signals within said memory cycle;

wherein staggering the strobing of either said RAS or CAS signals causes said memories to be accessed in a staggered fashion to transfer data between said graphics processor and said memories, such that overall data transfer rate is faster than said memory cycle of one of said memories.

11. The apparatus of claim 10, wherein said graphics processor provides a write enable signal coupled to all of said memories for writing data into said memories.

12. The apparatus of claim 11, wherein said graphics processor provides a first row address on said address bus and all RAS signals strobing said first row address into said memories; said graphics processor then providing a first column address on said address bus; said graphics processor also providing data for each memory sequentially; and said graphics processor providing said CAS signals in said staggered fashion to coincide with presence of its corresponding data on said data bus, wherein data is written to said memories in said staggered fashion.

13. The apparatus of claim 11, wherein said graphics processor provides a separate row address on said address bus sequentially for each of said memories; said graphics processor providing said RAS signals in said staggered fashion to coincide with presence of its corresponding row address to strobe said separate row address into its corresponding memory in said staggered fashion; then, said graphics processor providing a first column address on said address bus and data on said data bus; said processor strobing all CAS signals to strobe in said first column address and data to said memories.

14. The apparatus of claim 11, wherein said graphics processor provides a separate output enable signal to each of said memories, wherein activation of each of said separate output enable signals in a staggered fashion causes data to be read from its corresponding memory, so that data can be read from said memories in a staggered fashion.

15. The apparatus of claim 14, wherein said graphics processor provides a first row address on said address bus and all RAS signals strobing said first row address into said memories; said graphics processor then providing a first column address on said address bus; said graphics processor also providing said CAS signals and said output enable signals in a staggered fashion, such that said first column address is strobed in and data read from said memories in said staggered fashion.

16. In a graphics display system having a host processor which provides instruction for providing an image to be displayed, an apparatus for providing pixel information for a raster scan display having pixels arranged in a plurality of horizontal lines to form said raster scan display, comprising:

a plurality of memories arranged in an array accessed by row address data and column address data in a memory cycle;

a graphics processor coupled to said memories;

a first data bus coupled to said graphics processor;

a data switcher coupled to said first data bus;

a plurality of second data buses coupled to said data switcher, wherein each of said second data buses is coupled to its corresponding memory chips forming a column of said memory array;

an address bus coupled to said graphics processor and said memories for coupling said row address data and said column address data from said graphics processor to said memories for accessing location in said memories;

said graphics processor providing a separate row address strobe (RAS) signal and a separate column address strobe (CAS) signal to corresponding memories comprising a column of said array, said graphics processor coupling a read and a write enable signals to all chips of said memory, each of said RAS signals and each of said CAS signals being independently provided by said graphics processor and independently coupled to said memories;

all of said RAS signals individually capable of having associated row address data which is unique from all other row address data associated with other RAS signals within said memory cycle and all of said CAS signals individually capable of having associated data which is unique from all other data associated with other CAS signals within said memory cycle;

wherein staggering the strobing of either said RAS or CAS signals causes memories comprising said column of said array to be accessed in a staggered fashion to transfer data between said graphics processor and said memories, such that overall data transfer rate is faster than said memory cycle of one of said memories.

17. The apparatus of claim 16 further comprising:

an address switcher coupled to said first address bus;

a plurality of second address buses coupled to said address switcher, wherein instead of said first address bus being coupled to said memories, each of said second address buses being coupled to corresponding memories comprising a column of said array;

said address switcher for providing address signals on said first bus onto one or all of said second address buses.

18. In an apparatus for providing video data for a raster scan display having pixels along a plurality of horizontal lines and where a graphics processor is coupled to a memory having a plurality of memory devices, said memory devices accessed by row and column address data within a memory cycle and where pixel data for said display is processed by said processor and stored in said memory, said processor manipulating said pixel data, an improvement comprising:

a plurality of separate row address strobe (RAS) lines, one RAS line coupled to each of said memories for strobing in a row address signal;

a plurality of separate column address strobe (CAS) lines, one CAS line coupled to each of said memories for strobing in a column address signal;

each of said RAS lines and each of said CAS lines being independently provided by said graphics processor and independently coupled to said memory devices;

all of said RAS lines individually capable of having associated row address data which is unique from all other row address data associated with other RAS lines within said memory cycle and all of said CAS lines individually capable of having associated data which is unique from all other data associated with other CAS lines within said memory cycle;

wherein said RAS or CAS lines are strobed at staggered time intervals to provide data transfers between said memory and said graphics processor at a rate faster than said memory cycle time of one of said memories.

* * * * *